US012603271B2

(12) United States Patent
Jeon et al.

(10) Patent No.: US 12,603,271 B2
(45) Date of Patent: Apr. 14, 2026

(54) APPARATUS FOR PRE-LITHIATION OF NEGATIVE ELECTRODE AND METHOD FOR PRE-LITHIATION OF NEGATIVE ELECTRODE

(71) Applicant: LG ENERGY SOLUTION, LTD., Seoul (KR)

(72) Inventors: Seo Young Jeon, Daejeon (KR); Ye Ri Kim, Daejeon (KR); Oh Byong Chae, Daejeon (KR); Seung Hae Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 819 days.

(21) Appl. No.: 17/781,263

(22) PCT Filed: Sep. 3, 2021

(86) PCT No.: PCT/KR2021/011949
§ 371 (c)(1),
(2) Date: May 31, 2022

(87) PCT Pub. No.: WO2022/075602
PCT Pub. Date: Apr. 14, 2022

(65) Prior Publication Data

US 2023/0006187 A1 Jan. 5, 2023

(30) Foreign Application Priority Data

Oct. 5, 2020 (KR) ........................ 10-2020-0128084

(51) Int. Cl.
*H01M 4/04* (2006.01)
*H01M 4/139* (2010.01)
(Continued)

(52) U.S. Cl.
CPC ......... *H01M 4/0452* (2013.01); *H01M 4/139* (2013.01); *H01M 4/62* (2013.01); *H01M 2004/027* (2013.01)

(58) Field of Classification Search
CPC ............. H01M 4/0445; H01M 4/0452; H01M 4/0459; H01M 4/139; H01M 4/62; H01M 10/0525; H01M 2004/027; Y02E 60/10
See application file for complete search history.

(56) References Cited

U.S. PATENT DOCUMENTS 5,595,837 A * 1/1997 Olsen ...................... H01M 4/13 205/59
9,598,789 B2 3/2017 Grant et al.
(Continued)

FOREIGN PATENT DOCUMENTS

CN 103378349 A 10/2013
CN 109103496 A * 12/2018
(Continued)

OTHER PUBLICATIONS

"Cheng et al., CN-109103496-A—Translated, Dec. 28, 2018" (Year: 2018).*
(Continued)

*Primary Examiner* — Niki Bakhtiari
*Assistant Examiner* — Jesse J Efymow
(74) *Attorney, Agent, or Firm* — Birch, Stewart, Kolasch & Birch, LLP

(57) ABSTRACT

An apparatus for pre-lithiating a negative electrode includes a pre-lithiation reactor sequentially divided into an impregnation section, a pre-lithiation section and an aging section, and accommodates a pre-lithiation solution in which a negative electrode structure is moved; a negative electrode roll arranged outside the pre-lithiation solution and on which the negative electrode structure before being moved is
(Continued)

wound; a lithium metal counter electrode arranged in the pre-lithiation solution in the pre-lithiation section and is spaced apart from the negative electrode structure by a predetermined distance to face the negative electrode structure which is moved in the pre-lithiation solution; and a charge and discharge unit connected to the negative electrode structure and the lithium metal counter electrode. A method for pre-lithiating the negative electrode is also provided.

17 Claims, 5 Drawing Sheets

(51) Int. Cl.
*H01M 4/62* (2006.01)
*H01M 4/02* (2006.01)

(56) References Cited

U.S. PATENT DOCUMENTS

| | | | | |
|---|---|---|---|---|
| 2007/0278105 | A1* | 12/2007 | Ettel | C25D 17/008 204/280 |
| 2012/0018309 | A1 | 1/2012 | Min et al. | |
| 2013/0288130 | A1 | 10/2013 | Sheem et al. | |
| 2013/0327648 | A1 | 12/2013 | Grant et al. | |
| 2015/0191841 | A1* | 7/2015 | Grant | H01M 4/139 205/59 |
| 2016/0141596 | A1 | 5/2016 | Uhm et al. | |
| 2017/0187030 | A1* | 6/2017 | Grant | C25D 5/022 |
| 2021/0135274 | A1* | 5/2021 | Chae | H01M 4/661 |
| 2021/0384485 | A1 | 12/2021 | Chae et al. | |
| 2022/0006071 | A1* | 1/2022 | Petrowsky | H01M 50/446 |
| 2022/0328805 | A1* | 10/2022 | Jeon | H01M 4/0445 |

FOREIGN PATENT DOCUMENTS

| | | | | |
|---|---|---|---|---|
| CN | 109103498 | A | | 12/2018 |
| CN | 110335992 | A | | 10/2019 |
| CN | 114467194 | A | | 5/2022 |
| EP | 4 020 627 | A1 | | 6/2022 |
| JP | 5-41249 | A | | 2/1993 |
| JP | 2008-16199 | A | | 1/2008 |
| JP | 2008-91191 | A | | 4/2008 |
| JP | 2013-232413 | A | | 11/2013 |
| JP | 2017-11068 | A | | 1/2017 |
| KR | 10-2012-0010414 | A | | 2/2012 |
| KR | 10-2014-0106645 | A | | 9/2014 |
| KR | 10-2015-0014676 | A | | 2/2015 |
| KR | 10-1683208 | B1 | | 12/2016 |
| KR | 2020-0053300 | A | * | 5/2020 |
| KR | 10-2020-0048844 | A | | 6/2020 |
| KR | 10-2020-0053300 | A | | 12/2025 |
| WO | WO 2020/088177 | A | | 5/2020 |

OTHER PUBLICATIONS

"Bae Hong et al., KR-2020-0053300-A—Translated, May 18, 2020" (Year: 2020).*

International Search Report (PCT/ISA/210) issued in PCT/KR2021/011949, dated Dec. 13, 2021.

Sun et al., "In situ formation of a multicomponent inorganic-rich SEI layer provides a fast charging and high specific energy Li-metal battery", Journal of Material Chemistry A, vol. 7, No. 30, 2019, pp. 17782-17789.

Japanese Notice of Reasons for Refusal for Japanese Application No. 2022-532651, dated May 8, 2023, with English translation.

Extended European Search Report for corresponding European Application No. 21877854.6, dated Jul. 7, 2023.

* cited by examiner

【FIG. 1】
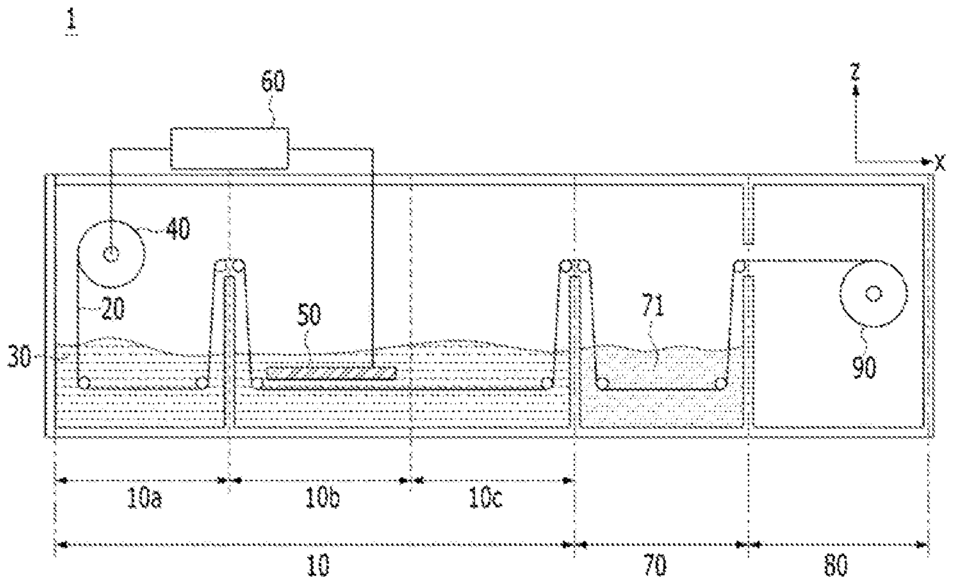

【FIG. 2】
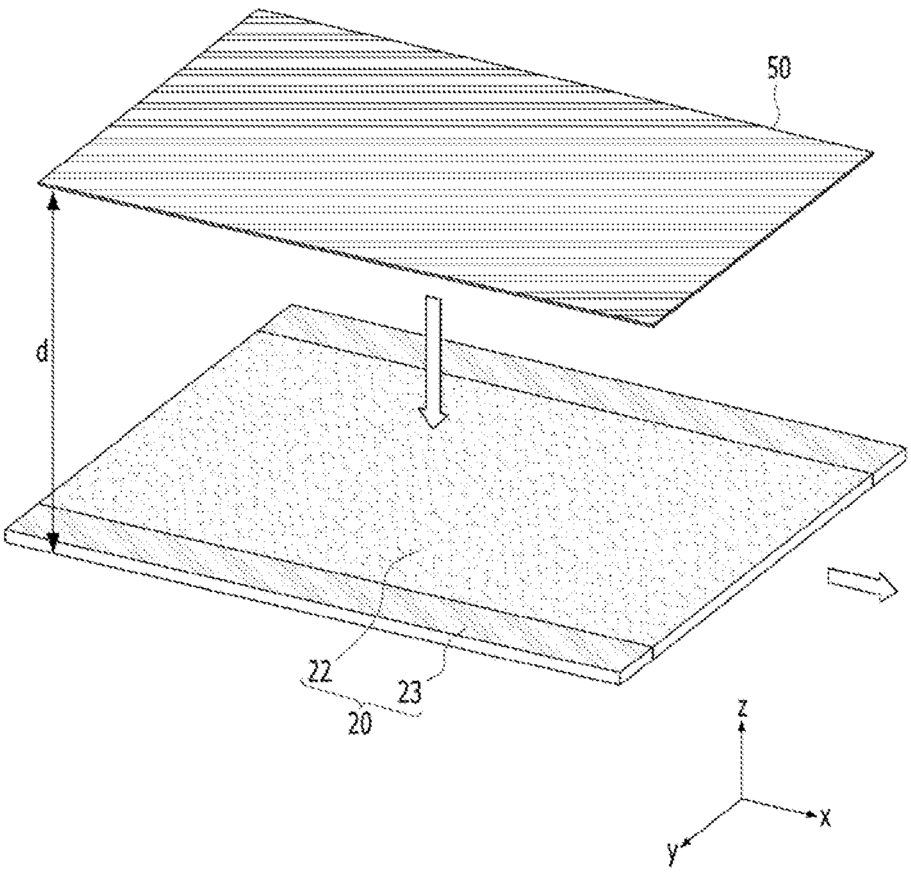

【FIG. 3】
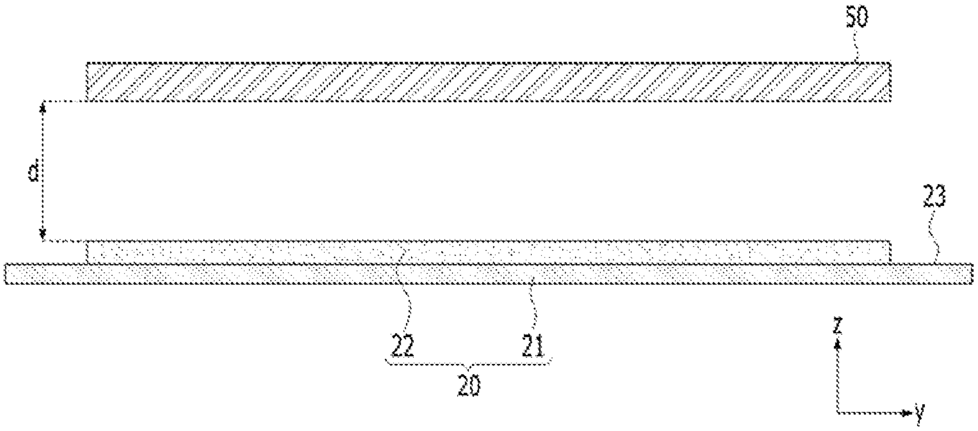

【FIG. 4】
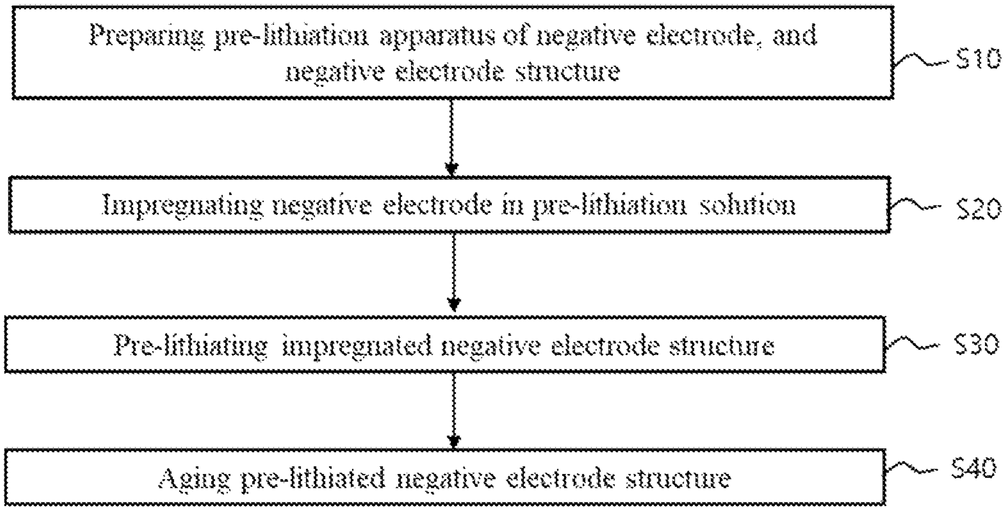

【FIG. 5】
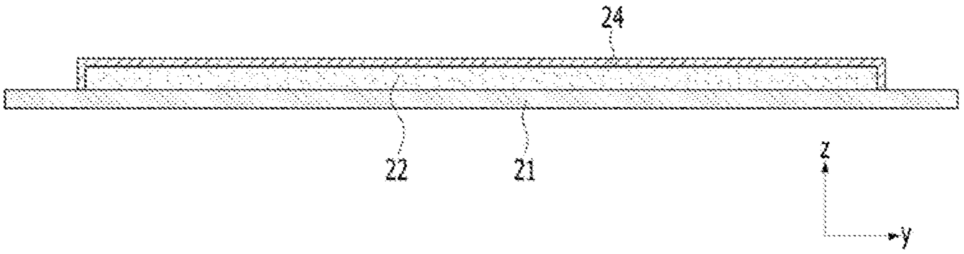

APPARATUS FOR PRE-LITHIATION OF NEGATIVE ELECTRODE AND METHOD FOR PRE-LITHIATION OF NEGATIVE ELECTRODE

TECHNICAL FIELD

This application claims the benefit of priority based on Korean Patent Application No. 10-2020-0128084, filed on Oct. 5, 2020, and the entire contents of the Korean patent application are incorporated herein by reference.

The present invention relates to an apparatus and method for pre-lithiating a negative electrode.

BACKGROUND ART

Recently, as wireless mobile devices are widely used, the demand for secondary batteries is high. In addition, as carbon energy is gradually depleted and interest in environmental pollution increases, secondary batteries are becoming popular globally as an alternative energy source. Therefore, the scope of utilization of secondary batteries is expected to be more diversified and expanded in the feature. Accordingly, many studies on secondary batteries that can respond to various needs are being conducted.

In order to prepare a secondary battery, first, a positive electrode and a negative electrode are formed by applying an electrode mixture containing an electrode active material to a surface of a current collector, then a separator is interposed therebetween to thereby make an electrode assembly, which is then mounted in a cylindrical or rectangular metal can or inside a pouch-type case of an aluminum laminate sheet, and a liquid electrolyte is injected or impregnated into the electrode assembly or a solid electrolyte to prepare a secondary battery.

Specifically, in the case of such a negative electrode, a passive film such as a solid electrolyte interface (SEI) layer is formed on the surface of the negative electrode during the initial charge. The passive film interrupts injection of the organic solvent into the negative electrode and suppresses decomposition reaction of the organic solvent by preventing the movement of electrons while acting as an ion tunnel by allowing the passing of only lithium ions, thereby stabilizing the structure of the negative electrode, improving the reversibility of the negative electrode, and allowing the negative electrode to be usable. However, since the reaction of the passive film formation is an irreversible reaction, there is a problem that the capacity of the battery is reduced by consuming lithium ions. Further, the charge/discharge efficiency of the battery is not completely 100%. Hence, as the cycle of the battery is repeated, consumption of lithium ions occurs, thereby reducing capacity and deteriorating the cycle lifespan.

As such, a method for forming a passive film on the surface of a negative electrode, preventing the capacity reduction and improving cycle lifespan by pre-lithiating the negative electrode through inserting lithium into the negative electrode is currently developed.

Such a pre-lithiation method includes a physical method of allowing lithium metal to directly contact the surface of the negative electrode, and a method of connecting lithium metal with the negative electrode and electrochemically charging the negative electrode. At this time, in the case of an electrochemical charging scheme, charging is performed in a state that the lithium metal is made to be spaced apart from the negative electrode by a predetermined distance in the electrolyte solution. In this case, the composition of the SEI film is changed according to the distance between the lithium metal and the negative electrode, thereby deteriorating the performance of the battery. Therefore, there is a need for a technology for enhancing the efficiency and cycle characteristics of a battery through formation of an improved SEI film through adjustment of a distance between a lithium metal and a negative electrode at the time of pre-lithiation.

DISCLOSURE

Technical Problem

An object of the present invention is to provide a negative electrode pre-lithiation apparatus and method for enhancing initial efficiency of a negative electrode and preventing degeneration of a battery by adjusting composition of an SEI film in pre-lithiating a negative electrode according to an electrochemical charging scheme.

Technical Solution

An apparats for pre-lithiating a negative electrode according to the present invention includes: a pre-lithiation reactor sequentially divided into an impregnation section, a pre-lithiation section and an aging section, the pre-lithiating reactor accommodating a pre-lithiation solution through which a negative electrode structure is movable; a negative electrode roll arranged outside the pre-lithiation solution, the negative electrode structure being wound on the negative electrode roll before being moved through the pre-lithiation solution, a lithium metal counter electrode arranged in the pre-lithiation solution in the pre-lithiation section, the lithium metal counter electrode being spaced apart from the negative electrode structure by a predetermined distance to face the negative electrode structure while the negative electrode structure is moved through the pre-lithiation solution; and a charge and discharge unit connected to the negative electrode structure and the lithium metal counter electrode, wherein a separation distance between the lithium metal counter electrode and the negative electrode structure is in a range of 7 to 15 mm.

In a specific example, the separation distance between the lithium metal counter electrode and the negative electrode structure may be in a range of 9 to 13 mm.

At this time, the lithium metal counter electrode may be arranged in a direction parallel to the negative electrode structure.

In one example, the lithium metal counter electrode includes a lithium metal laminated on a stainless steel substrate.

In one example, the negative electrode structure has a negative electrode current collector, a negative electrode active material layer on at least one surface of the negative electrode current collector, and a non-coated part on the at least one surface of negative electrode current collector in a width direction of, and adjacent to, the negative electrode active material layer.

At this time, the lithium metal counter electrode may be arranged to face only the negative electrode active material layer.

In one example, the apparatus for pre-lithiating a negative electrode according to the present invention further includes a washing tank containing an organic solvent.

In one example, the apparatus further includes a drying unit to dry the negative electrode structure having passed through the washing tank, and a collection roll for winding and unwinding the negative electrode structure transferred to the drying unit.

Further, the present invention provides a method for pre-lithiating a negative electrode.

A method for pre-lithiating a negative electrode according to the present invention includes: preparing the negative electrode and the above-described apparatus for pre-lithiating the negative electrode; impregnating the negative electrode structure with the pre-lithiation solution while moving the negative electrode structure in the impregnation section in the pre-lithiation reactor; pre-lithiating the impregnated negative electrode structure while moving the negative electrode structure in the pre-lithiation solution of the pre-lithiation section to provide a pre-lithiated negative electrode structure; and aging the pre-lithiated negative electrode structure in the aging section, wherein the pre-lithiating is performed by electrochemically charging the negative electrode structure.

Specifically, the separation distance between the lithium metal counter electrode and the negative electrode structure may be in a range of 9 to 13 mm.

At this time, the lithium metal counter electrode may be arranged in a direction parallel to the negative electrode structure.

In one example, the lithium metal counter electrode includes a lithium metal laminated on a stainless steel substrate.

In one example, the negative electrode structure includes a negative electrode current collector, a negative electrode active material layer on at least one surface of the negative electrode current collector, and a non-coated part on the at least one side of the negative electrode current collector in a width direction of, and adjacent to, the negative electrode active material layer.

At this time, the lithium metal counter electrode may be arranged to face only the negative electrode active material layer.

Further, the method of pre-lithiating a negative electrode according to the present invention further includes washing and drying the negative electrode structure.

Further, an SEI film is formed on a surface of the negative electrode structure, and a content ratio of $Li_2CO_3$ to $ROCO_2Li$ within the SEI film may be in a range of 1.5 to 5.

Herein, the R is at least one selected from the group consisting of an alkyl group having 1 to 4 carbon atoms and an alkylene glycol having 1 to 4 carbon atoms.

Further, the present invention provides a negative electrode having a SEI film on a surface of the negative electrode, and a content ratio of $Li_2CO_3$ to $ROCO_2Li$ within the SEI film may be in a range of 1.5 to 5.

Herein, the R is at least one selected from the group consisting of an alkyl group having 1 to 4 carbon atoms and an alkylene glycol having 1 to 4 carbon atoms.

Advantageous Effects

According to a method of pre-lithiating a negative electrode of the present invention, it is possible to improve initial efficiency and cycle characteristics of a battery by setting the distance between the lithium metal counter electrode and the negative electrode structure to be in the range of 7 to 15 mm during the process of electrochemically charging a negative electrode.

BRIEF DESCRIPTION OF THE DRAWINGS

FIG. 1 is a schematic diagram showing the structure of an apparatus for pre-lithiating a negative electrode according to the present invention.

FIGS. 2 and 3 are schematic diagrams illustrating an array relationship between a negative electrode structure and a lithium metal counter electrode in an apparatus for pre-lithiating a negative electrode according to the present invention.

FIG. 4 is a flowchart illustrating the sequence of a method of pre-lithiating a negative electrode according to the present invention.

FIG. 5 is a schematic diagram showing a negative electrode prepared according to a method of pre-lithiating a negative electrode according to the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof.

Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail with reference to the drawings.

FIG. 1 is a schematic diagram showing the structure of an apparatus for pre-lithiating a negative electrode according to the present invention. FIGS. 2 and 3 are schematic diagrams illustrating an array relationship between a negative electrode structure and a lithium metal counter electrode in an apparatus for pre-lithiating a negative electrode according to the present invention.

Referring to FIG. 1, the apparatus 1 for pre-lithiating a negative electrode according to the present invention includes: a pre-lithiation reactor 10 which is sequentially divided into an impregnation section 10*a*, a pre-lithiation section 10*b* and an aging section 10*c*, and accommodates a pre-lithiation solution 30 in which a negative electrode structure 20 is moved; a negative electrode roll 40 which is arranged outside the pre-lithiation solution 30 and on which the negative electrode structure 20 before being moved is wound; a lithium metal counter electrode 50 which is arranged in the pre-lithiation solution 30 in the pre-lithiation section 10*b* and is spaced apart from the negative electrode structure 20 by a predetermined distance to face the negative electrode structure 20 which is moved in the pre-lithiation solution 30; and a charge and discharge unit 60 which is connected to the negative electrode structure 20 and the lithium metal counter electrode 50.

Further, in the present invention, the direction, in which the negative electrode structure is moved in each section, is defined as the moving direction, which is indicated as the x-axis direction. Further, the width direction of the negative electrode structure is a direction perpendicular to the moving direction and is indicated as the y-axis direction.

As described above, in the case of a pre-lithiation method through electrochemical charge as in a prior art, charging is performed in a state that the lithium metal is made to be spaced apart from the negative electrode by a predetermined distance in the electrolyte solution. In this case, the composition of the SEI film becomes different according to the distance, thereby deteriorating the performance of the battery.

As such, according to the present invention, in the process of electrochemically charging a negative electrode, it is possible to prevent reaction with oxygen or carbon dioxide by setting the separation distance (d) between the lithium metal counter electrode and the negative electrode structure to be in the range of 7 to 15 mm as illustrated in FIGS. 2 and 3, thereby improving the initial efficiency and cycle characteristics of the battery.

Specifically, the separation distance (d) may be in the range of 9 to 13 mm.

Hereinafter, the configuration of an apparatus for pre-lithiating a negative electrode according to the present invention will be described in detail.

Referring to FIG. 1, an apparatus 1 for pre-lithiating a negative electrode of the present invention may be an apparatus for pre-lithiating a negative electrode structure, for example, pre-lithiating a negative electrode by using an electrochemical charging scheme, and may be an apparatus for pre-lithiating a negative electrode using a roll-to-roll process.

Specifically, the pre-lithiation reactor 10 is a place where a pre-lithiation solution 30 is accommodated, and impregnation, pre-lithiation reaction, and aging of the negative electrode structure are performed. The pre-lithiation reactor 10 is sequentially divided into an impregnation section **10*a*, a pre-lithiation section 10*b*, and an aging section 10*c*. As such, the negative electrode structure 20, which is unwound from the negative electrode roll 40, is inserted into the pre-lithiation solution 30 to thereby be moved in each section of the pre-lithiation reactor 10**.

At this time, sections were not divided in the pre-lithiation reactor 10 in a closed manner and were abstractly divided according to the process which was performed according to the position of the negative electrode structure 20 in the pre-lithiation reactor 10. Specifically, the impregnation section **10*a*, the pre-lithiation section 10*b*, and the aging section 10*c* were not physically divided and were abstractly divided according to the process in which the negative electrode structure 20 was performed in the corresponding section. As the negative electrode structure 20 is moved in the pre-lithiation reactor 10, the negative electrode structure 20** is pre-lithiated while passing through each section. The movement of the negative electrode structure may be performed by a transfer roll in the pre-lithiation solution.

Further, the pre-lithiation solution 30 may contain a lithium salt and an organic solvent. Those conventionally used in the electrolyte solution for lithium secondary batteries may be used as the lithium salt without limitation. Specifically, the lithium salt may contain at least one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloro boran lithium, low aliphatic carboxylic acid lithium, and 4 phenyl boric acid lithium.

Any organic solvent, which is commonly used in the related art, may be used as the organic solvent, but a high boiling point organic solvent may be preferably used to minimize the consumption of the electrolyte solution for pre-lithiation by evaporation during pre-lithiation.

For example, the organic solvent may contain at least one selected from the group consisting of a carbonate solvent and an ester-based solvent. The non-aqueous solvent may contain at least one selected from the group consisting of propylene carbonate (PC), ethylene carbonate (EC), diethyl carbonate (DEC), dimethylcarbonate (DMC), dipropyl carbonate (DPC), dimethylsulfoxide, acetonitrile, dimethoxyethane, diethoxyethane, tetrahydrofuran, N-methyl-2-pyrrolidone (NMP), ethyl methylcarbonate (EMC), gamma butyrolactone (g-butyrolactone), ethyl propionate, methyl propionate, but the present invention is not limited thereto.

Further, the pre-lithiation solution may further contain an additive, and the additive may include at least one selected from the group consisting of vinylene carbonate, vinylethylene carbonate, fluoroethylene carbonate, salicylic acid, LiBF4, LITFSI (Lithium bis(trifluoromethanesulfonyl)imide), LiBOB (Lithium bis(oxalato)borate), and LiODFB (Lithium difluoro(oxalato)borate).

Further, the temperature of the pre-lithiation solution may be 10 to 80° C., specifically 20 to 60° C., and more specifically 25 to 40° C. When pre-lithiation is performed in the above temperature range, lithiation can be smoothly diffused.

As the pre-lithiation solution 30 is accommodated in the pre-lithiation reactor 10, the pre-lithiation solution 30 is included in all of the impregnation section **10*a*, the pre-lithiation section 10*b*, and the aging section 10*c***.

The size, shape, etc. of the pre-lithiation reactor 10 may be appropriately designed in consideration of the impregnation, pre-lithiation, and aging degree of the negative electrode structure, and the moving distance of the negative electrode structure according to the roll-to-roll process, etc.

Further, the size or length of the impregnation section **10*a*, the pre-lithiation section 10*b*, and the aging section 10*c* may be appropriately designed in consideration of the electrolyte solution impregnation, pre-lithiation and aging degree of the negative electrode structure 20. Specifically, the ratio of lengths of the impregnation section 10*a*, the pre-lithiation section 10*b*, and the aging section 10*c*** can be appropriately designed for smooth pre-lithiation.

Further, the apparatus 1 for pre-lithiating a negative electrode according to the present invention includes a negative electrode roll 40 on which the negative electrode structure 20 is wound. The negative electrode structure 20 may be wound on the negative electrode roll 40 and then unwound from the negative electrode roll to thereby be inserted into the pre-lithiation solution 30 in the pre-lithiation reactor 10. Any roll, which is commonly used in a roll-to-roll process, may be used as the negative electrode roll 40.

The diameter, width, etc. of the negative electrode roll 40 may be appropriately designed in consideration of the thickness, amount, etc. of the wound negative electrode structure. For example, the diameter of the negative electrode roll 40 may be in the range of 3 to 50 cm, and specifically in the range of 5 to 12 cm. The width of the negative electrode roll 40 may be in the range of 5 to 40 cm, and specifically in the range of 10 to 20 cm.

The negative electrode structure 20 has a structure that a negative electrode active material layer 22 is formed on at least one surface of a negative electrode current collector 21, and a non-coated part 23 is formed on at least one side in a width direction of the negative electrode active material layer 22. At this time, a negative electrode slurry containing a negative electrode active material is applied and is then dried and rolled to thereby form a negative electrode active material layer 22. The negative electrode slurry may further include conductive materials and binders.

The negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

The negative electrode active material may contain at least one selected from the group consisting of a carbon-based active material and a silicon-based active material.

The silicon-based active material may impart excellent capacity characteristics to the negative electrode or secondary battery of the present invention and may contain a compound represented by $SiO_x$ ($0 \leq x < 2$). Since $SiO_2$ does not react with lithium ions, lithium cannot be stored, and thus x is preferably in the above range. More preferably, the silicon-based oxide may be SiO. The average particle diameter ($D_{50}$) of the silicon-based oxide may be 1 to 30 μm, and preferably 3 to 15 μm in terms of reducing side reaction with the electrolyte solution while maintaining structural stability during charge/discharge. The average particle diameter $D_{50}$ may be measured using, for example, a laser diffraction method.

The carbon-based active material may impart excellent cycle characteristics or battery lifespan performance to a secondary battery or a negative electrode for a secondary battery of the present invention. Specifically, the carbon-based active material may contain at least one selected from the group consisting of artificial graphite, natural graphite, hard carbon, soft carbon, carbon black, acetylene black, Ketjen black, super P, graphene and textile carbon, and preferably at least one selected from the group consisting of artificial graphite and natural graphite. The average particle diameter ($D_{50}$) of the carbon-based oxide may be 10 to 30 μm, and preferably 15 to 25 μm in terms of reducing side reaction with the electrolyte solution while maintaining structural stability during charge/discharge.

Specifically, both the silicon-based active material and the carbon-based active material may be used as the negative electrode active material in terms of improving both the capacity characteristics and cycle characteristics. Specifically, the negative electrode active material may include the carbon-based active material and the silicon-based active material in the weight ratio of 50:50 to 95:5, and preferably in the weight ratio of 60:40 to 80:20.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and thermal black; conductive fibers such as carbon fiber and metal fiber; carbon fluoride; metal powders such as aluminum and nickel powder; conductive whiskers such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, ethylene-propylene-diene terpolymer (EPDM), sulfonated EPDM, styrene butylene rubber, fluorine rubber, various copolymers and the like.

The negative electrode structure 20 can be pre-lithiated by being charged and discharged by a charge and discharge unit 60 after being connected to the charge and discharge unit 60 together with a lithium metal counter electrode 50 to be described later.

Further, in the present invention, the lithium metal counter electrode 50 may be disposed in the pre-lithiation solution 30 and be disposed to be spaced apart from the negative electrode structure 20 by a predetermined distance to face the negative electrode structure 20, to thereby function as a counter electrode to the negative electrode structure during electrochemical charge for pre-lithiation. Specifically, when the lithium metal counter electrode 50 is pre-lithiated by electrochemical charging, the lithium metal counter electrode 50 may function as a lithium source which supplies lithium ions into the negative electrode structure 20. The lithium metal counter electrode 50 may have a sheet form disposed to face the negative electrode structure 20.

The thickness of the lithium metal counter electrode 50 may be appropriately set in consideration of the pre-lithiation level, and may specifically be 10 to 500 μm, and more specifically be 40 to 200 μm.

Further, the lithium metal counter electrode 50 has been obtained by laminating a lithium metal on a stainless steel substrate. Through this, the lithium metal counter electrode can be easily connected to the charge and discharge unit, and as the pre-lithiation is performed, the lithium metal can be supported in a state that has been spaced apart from the negative electrode structure by a predetermined distance even if the size of the lithium metal is reduced.

Further, the lithium metal counter electrode 50 may be disposed to be spaced apart from the negative electrode structure 20 by a predetermined distance. As such, the lithium metal counter electrode 50 can prevent a short circuit phenomenon which may occur by a direct contact between the negative electrode structure 20 and the lithium metal counter electrode 50 during electrochemical charge by being spaced apart from the negative electrode structure 20. Further, as will be described later, it is possible to prevent redox reaction from being generated on the surface of the negative electrode by adjusting the content of components contained in the SEI film through the adjustment of the distance between the negative electrode structure 20 and the lithium metal counter electrode 50.

Specifically, referring to FIGS. 2 and 3 together with FIG. 1, the separation distance (d) between the lithium metal counter electrode 50 and the negative electrode structure 20 may be in the range of 7 to 15 mm, and specifically in the range of 9 to 13 mm.

At this time, the lithium metal counter electrode 50 may be arranged in a direction parallel to the negative electrode structure 20.

It is possible to form a SEI film such as $Li_2CO_3$ having a high content of inorganic components rather than an organic film such as $ROCO_2Li$ by adjusting the distance (d) between the lithium metal counter electrode and the negative electrode structure to be in the above range. At this time, the R is one or more selected from the group consisting of an alkyl group having 1 to 4 carbon atoms and alkylene glycol having 1 to 4 carbon atoms, and more specifically, the R may be a methyl group, an ethyl group, or an ethylene glycol group. In this case, the content ratio of $Li_2CO_3$ to $ROCO_2Li$ may be in the range of 1.5 to 5. The R may be changed according to the organic solvent, and the specific structure and cause of generation of $ROCO_2Li$ are shown in Table 1 below.

At this time, the ratio of $Li_2CO_3$ to $ROCO_2Li$ may be measured using nuclear magnetic resonance (NMR). In this case, any NMR equipment capable of analyzing various nuclides can be used without limitation. For example, NMR equipment of Varian Company, and the spectrum for $^1H$ NMR can be measured.

TABLE 1

| R | Structure and component name | Remark |
|---|---|---|
| Ethylene glycol group | 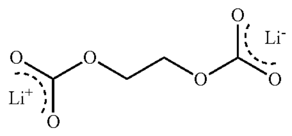 Lithium Ethylene Dicarbonate (LEDC) | EC reduction decomposition |
| Ethyl group | 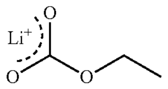 Lithium Ethyl Catbonate (LEC) | EMC reduction decomposition |
| Methyl group | 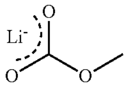 Lithium Methyl Carbonate (LMC) | EMC reduction decomposition |

The components of the SEI film, which is formed on the surface of the negative electrode according to the pre-lithiation, are changed according to the voltage range in which the SEI film is formed. In a low potential, a lot of electrons are received, and an SEI film having a large content of $Li_2CO_3$, which is an inorganic component, is easily formed, and in a high potential, one electron is spent, and an SEI film having a large content of $ROCO_2Li$, which is an organic component, is easily formed. Hence, if the distance increases, the resistance increases, and as the polarization increases, the potential decreases. If a low potential is formed by appropriately increasing the distance using such a principle, it is possible to form an inorganic film containing a large content of $Li_2CO_3$. Since such an inorganic film has a characteristic which can block external oxygen or carbon dioxide from the negative electrode, it is possible to effectively prevent redox reaction of the negative electrode with external oxygen or carbon dioxide. Namely, it is possible to prevent consumption of lithium ions and electrons introduced in advance through pre-lithiation, through which the initial efficiency and cycle characteristics of the battery can be improved.

Further, when the separation distance (d) between the lithium metal counter electrode 50 and the negative electrode structure 20 is less than 7 mm, organic components in the SEI film may increase due to a short distance, and when the separation distance (d) between the lithium metal counter electrode 50 and the negative electrode structure 20 exceeds 15 mm, pre-lithiation reaction may not be smoothly performed due to a long distance.

Further, referring to FIG. 3, the lithium metal counter electrode 50 is arranged to face only the negative electrode active material layer 22. Namely, the lithium metal counter electrode 50 is arranged not to face the non-coated part 23 formed on two sides of the negative electrode active material layer 22. This is to prevent lithium metal from being precipitated on the non-coated part 23 as the lithium metal counter electrode 50 faces the non-coated part 23.

To this end, the length in the width direction (y-axis direction) of the lithium metal counter electrode 50 may be the same as the length in the width direction of the negative electrode active material layer 22. Alternatively, the length in the width direction of the lithium metal counter electrode may be set to be smaller than the length in the width direction of the negative electrode active material layer by reflecting the degree to which the negative electrode structure is shaken during movement.

Further, referring to FIGS. 1 to 3, the negative electrode active material layer 22 is formed on only one surface of the negative electrode current collector 21, and the lithium metal counter electrode 50 is disposed to face only one surface where the negative electrode active material layer 22 is formed. In the case that the negative electrode active material layer is formed on two surfaces of the negative electrode current collector, two lithium metal counter electrodes may be disposed to face the negative electrode active material layer on two surfaces.

Further, referring to FIG. 1, an apparatus 1 for pre-lithiating a negative electrode according to the present invention further includes a washing tank 70 including an organic solvent 71. The washing tank 70 is arranged independently from the pre-lithiation reactor 10 and can be provided as a place for washing the negative electrode structure 20 where pre-lithiation has been performed. To this end, a transfer roll, which transfers the negative electrode structure 20 from the pre-lithiation reactor 10 to the washing tank 70, may be arranged between the pre-lithiation reactor 10 and the washing tank 70. As such, the negative electrode structure 20 is moved in the organic solvent 71 in the washing tank 70, and impurities remaining in the negative electrode structure 20 may be removed. The organic solvent 71 does not contain lithium salt, and the same one as the organic solvent used for the above-described pre-lithiation solution may be used. Specifically, at least one selected from the group consisting of dimethyl carbonate (DMC), ethylmethyl carbonate (EMC), and ethylene carbonate (EC) may be used as the organic solvent.

The length of the washing tank 70 or the moving distance of the negative electrode structure 20 in the washing tank 70 may correspond to 0.1 to 5 times, and preferably 0.5 to 3 times of the length of the pre-lithiation section **10*b***, and in this range, the remaining impurities of the negative electrode structure may be smoothly removed.

Further, referring to FIG. 1, the apparatus for pre-lithiating a negative electrode according to the present invention further includes a drying unit 80 for drying a negative electrode structure 20 having passed through the washing tank 70, and a collection roll 90 for winding and unwinding the negative electrode structure 20 transferred to the drying unit 80.

The drying unit 80 may be provided as a place where the negative electrode structure 20, which has passed through the pre-lithiation reactor 10 and the washing tank 70, is dried. A transfer roll, which transfers the negative electrode structure 20 from the washing tank 70 to the drying unit 80, may be arranged between the pre-lithiation reactor 10 and the washing tank 70. In addition, the drying unit 80 may include air or inert gas. The inert gas may be at least one selected from the group consisting of Ar, $N_2$ and He.

The temperature of the drying unit 80 may be in the range of 10 to 80° C., specifically in the range of 20 to 60° C., and more specifically in the range of 25 to 40° C. This temperature range is preferable in that the oxidation of the negative electrode structure can be prevented, and the pre-lithiated state can be maintained in the range.

The length of the drying unit 80 or the moving distance of the negative electrode structure in the drying unit 80 may correspond to 0.1 to 5 times and preferably 0.5 to 2 times of the length of the pre-lithiation section. In this range, the organic solvent remaining in the negative electrode structure can be smoothly removed, and it is possible to prevent a damage to the negative electrode structure, which may occur as the organic solvent remains in the negative electrode structure for a long time.

The collection roll 90 may wind and unwind the negative electrode structure transferred to the drying unit 80. The collection roll 90 may perform the function of collecting or retrieving the negative electrode structure which has been pre-lithiated, washed and dried. The collection roll 90 may be the same as the above-described negative electrode roll.

The present invention provides a method of pre-lithiating a negative electrode using the above-described apparatus for pre-lithiating a negative electrode.

FIG. 4 is a flowchart illustrating the sequence of a method of pre-lithiating a negative electrode according to the present invention.

Referring to FIG. 4, a method for pre-lithiating a negative electrode according to the present invention includes: preparing a negative electrode and the above-described apparatus for pre-lithiating a negative electrode (S10); impregnating the negative electrode structure with a pre-lithiation solution while moving the negative electrode structure in the impregnation section in the pre-lithiation reactor (S20); pre-lithiating the impregnated negative electrode structure while moving the negative electrode structure in the pre-lithiation solution of the pre-lithiation section (S30); and aging the pre-lithiated negative electrode structure in the aging section (S40). At this time, the pre-lithiating is performed by arranging a lithium metal counter electrode, which is disposed to be spaced apart from the negative electrode structure, in a pre-lithiation section, and electrochemically charging the negative electrode structure, and the separation distance between the lithium metal counter electrode and the negative electrode structure is in the range of 7 to 15 mm, specifically 9 to 13 mm. As the inorganic film content increases due to the separation distance, the initial efficiency and cycle characteristics of the battery can be improved.

According to the present invention, it is possible to form an SEI film capable of preventing reaction with oxygen or carbon dioxide by adjusting the separation distance between a lithium metal counter electrode and a negative electrode structure to be within a predetermined range during the process of electrochemically charging a negative electrode, thereby improving initial efficiency and cycle characteristics of a battery.

At this time, the lithium metal counter electrode may be arranged to be parallel to the negative electrode structure and may be generated by laminating lithium on a stainless substrate.

Referring to FIG. 4 together with FIGS. 1 to 3, a negative electrode structure 20 is inserted into the pre-lithiating apparatus 1 as described above. The negative electrode structure 20 has a structure where a negative electrode active material layer 22 is formed on at least one surface of the negative electrode current collector 21, and a non-coated part 23 is formed on at least one side of the negative electrode active material layer 22, and is formed by applying a negative electrode slurry including a negative electrode active material to the negative electrode current collector. The negative electrode structure is wound on the negative electrode roll.

Thereafter, the negative electrode structure 20 is unwound from the negative electrode roll 40 and is inserted into the pre-lithiation reactor 10. First of all, the negative electrode structure 20 is inserted into the impregnation section 10*a* in the pre-lithiation reactor 10 and is impregnated with the pre-lithiation solution 30 while moved.

At this time, the impregnation time may be appropriately set according to the pre-lithiation condition. For example, it may be 5 to 120 minutes, specifically 10 to 90 minutes, and more specifically 15 to 40 minutes. Through this, as the negative electrode structure becomes sufficiently set in the pre-lithiation solution, the pre-lithiation may be uniformly performed in the negative electrode structure. When the impregnation time exceeds the above range, the durability of the negative electrode structure decreases and the active material may be easily detached from the current collector. When the impregnation time is less than the range, it is difficult for the pre-lithiation solution to be sufficiently permeated into the negative electrode structure and it may become difficult for the pre-lithiation to be uniformly performed.

Thereafter, the negative electrode structure 20 is pre-lithiated while moving in the pre-lithiation section 10*b* where the lithium metal counter electrode 50 is arranged. The pre-lithiating is performed by arranging a lithium metal counter electrode 50, which is disposed to be spaced apart from the negative electrode structure 20, in a pre-lithiation section 10*b*, and electrochemically charging the negative electrode structure 20 through a charge and discharge unit 60.

At this time, the lithium metal counter electrode 50 can prevent a short circuit phenomenon which may occur by a direct contact between the negative electrode structure 20 and the lithium metal counter electrode 50 during electrochemical charge by being spaced apart from the negative electrode structure 20.

Further, pre-lithiation having a large inorganic film content is possible by adjusting the separation distance between the lithium metal counter electrode 50 and the negative electrode structure 20 to be in the range of 7 to 15 mm, and specifically in the range of 9 to 13 mm. The details about this are as described above.

Further, the lithium metal counter electrode 50 is arranged to face only the negative electrode active material layer 22. Namely, the lithium metal counter electrode 50 is arranged not to face the non-coated part 23 formed on two sides of the negative electrode active material layer 22. This is to prevent lithium metal from being precipitated on the non-coated part 23 as the lithium metal counter electrode 50 faces the non-coated part 23.

Further, the electrochemical charging process for pre-lithiation can be performed in the current density of 0.2 to 10 $mA/cm^2$, and preferably 2 to 6 $mA/cm^2$. When the electrochemical charging is performed in the current density of the above range, stable and uniform pre-lithiation can be performed on the negative electrode active material.

After the negative electrode structure 20 is pre-lithiated in the pre-lithiation section 10*b*, the negative electrode structure 20 is aged while passing through the aging section 10*c*. Herein, the aging is a step of leaving the pre-lithiated negative electrode structure 20 unattended in the pre-lithiation solution 30 for a predetermined time.

In this process, lithium ions inserted by pre-lithiation can be more uniformly diffused to the inside and the surface of the negative electrode active material. If the aging step is not performed after pre-lithiation, lithium ions are not uniformly diffused to the negative electrode active material, and accordingly, it may be difficult to sufficiently remove irreversible capacity (initial charge capacity-initial discharge capacity) which is generated as lithium ions are contained at the time of generating an SEI layer, and uniform charge/discharge may not be performed after manufacturing a negative electrode.

Time, for which the negative electrode structure 20 is moved in the aging section 10*c*, may correspond to 0.5 to 21 times, and preferably 1.8 to 10 times of the time for which the negative electrode structure 20 is moved in the pre-lithiation section 10*b*. In this range, diffusion of lithium ions into the negative electrode active material can be uniformly performed, and it is possible to prevent a phenomenon that the negative electrode active material layer is detached from the current collector due to the excessive aging or resistance increases due to the increase in the thickness of the film on the surface of the negative electrode.

Further, the method for pre-lithiating a negative electrode according to the present invention further includes taking the negative electrode structure 20 out of the pre-lithiation reactor and washing the negative electrode structure 20. Specifically, the negative electrode structure 20 is moved in the organic solvent 71 in the washing tank 70, and impurities remaining in the negative electrode structure 20 may be removed. The organic solvent 71 does not contain lithium salt, and the same one as the organic solvent used for the above-described pre-lithiation solution may be used.

Time, for which the aged negative electrode structure 20 is moved in the washing tank 71, may correspond to 0.1 to 5 times, and preferably 0.5 to 2 times of the time for which the negative electrode structure 20 is moved in the pre-lithiation section 10*b*. In this range, remaining impurities of the negative electrode structure 20 can be smoothly removed.

The method for pre-lithiating a negative electrode according to the present invention further includes drying the washed negative electrode structure.

The organic solvent remaining in the negative electrode structure may be removed by the impregnation, pre-lithiation, aging and/or washing processes by the drying step.

Specifically, the drying process can be performed by taking the washed negative electrode structure 20 out of the washing tank 70, inserting the negative electrode structure 20 into a separately prepared drying unit 80, and making the negative electrode structure 20 to be moved in the drying unit 80.

The drying step may be performed by air or inert gas. Specifically, the inert gas may be at least one selected from the group consisting of Ar, $N_2$ and He.

The drying step may be performed in the range of 10 to 80° C., specifically in the range of 20 to 60° C., and more specifically in the range of 25 to 40° C. This temperature range is preferable in that the oxidation of the negative electrode structure can be prevented, and the pre-lithiated state can be maintained in the range.

Time, for which the washed negative electrode structure 20 is dried, may correspond to 0.1 to 5 times and preferably 0.5 to 2 times of the time for which the negative electrode structure is moved in the pre-lithiation section 10*b*. In this range, it is possible to smoothly remove the organic solvent remaining in the negative electrode structure, and it is possible to prevent a damage to the negative electrode structure, which may occur as the organic solvent remains in the negative electrode structure for a long time.

The collection roll 90 may be installed in the drying unit 80, and the negative electrode structure 20 having moved in the drying unit 80 may be wound by the collection roll 90. The negative electrode structure 20 wound by the collection roll 90 may be cut into an appropriate size to thereby be finally manufactured as a negative electrode.

Likewise, an SEI film is formed on a surface of the pre-lithiated negative electrode structure. At this time, the SEI film has a characteristic capable of blocking external oxygen and carbon dioxide with respect to the negative electrode, through which initial efficiency and cycle characteristics of the battery can be improved.

Specifically, the content ratio of $Li_2CO_3$ to $ROCO_2Li$ in the SEI film may be in the range of 1.5 to 5, specifically 1.5 to 3, and more specifically 1.5 to 2. At this time, the R is one or more selected from the group consisting of an alkyl group having 1 to 4 carbon atoms and alkylene glycol having 1 to 4 carbon atoms, and more specifically, the R may be a methyl group, an ethyl group, or an ethylene glycol group. When the content ratio of $Li_2CO_3$ to $ROCO_2Li$ is in the above range, the performance of the battery such as cycle characteristics can be achieved.

Further, the present invention provides a negative electrode.

FIG. 5 is a schematic diagram showing a negative electrode prepared according to a method of pre-lithiating a negative electrode according to the present invention. The negative electrode has a structure where a negative electrode active material layer 22 has been formed on a current collector 21. At this time, the negative electrode is pre-lithiated in the above-described pre-lithiation method, and an SEI film 24 is formed on the surface. The SEI film has a characteristic capable of blocking external oxygen and carbon dioxide with respect to the negative electrode, through which initial efficiency and cycle characteristics of the battery can be improved.

Specifically, the content ratio of $Li_2CO_3$ to $ROCO_2Li$ in the SEI film may be in the range of 1.5 to 5, specifically 1.5 to 3, and more specifically 1.5 to 2. At this time, the R is one or more selected from the group consisting of an alkyl group having 1 to 4 carbon atoms and alkylene glycol having 1 to 4 carbon atoms, and more specifically, the R may be a methyl group, an ethyl group, or an ethylene glycol group. When the content ratio of $Li_2CO_3$ to $ROCO_2Li$ is in the above range, the performance of the battery such as cycle characteristics can be achieved.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

<Preparation of Negative Electrode Structure>

92 wt % of negative electrode active material (graphite 100%), 3 wt % of conductive material (Danka black), 3.5 wt % of binder (SBR), and 1.5 wt % of thickener (CMC) was added to water to thereby prepare a negative electrode slurry.

The negative electrode slurry was coated on one surface of the copper current collector (thickness: 8 μm), which was then rolled and dried at a vacuum oven of 130° C., to thereby form a negative electrode active material layer on one surface of the copper negative electrode current collector (thickness: 70 μm, width: 10 cm) and form the non-coated parts (1 cm) on two sides of the negative electrode active material layer, respectively, to thereby manufacture a negative electrode structure.

The negative electrode structure was wound on a negative electrode roll which is made of stainless steel and has a diameter of 3 inches.

<Preparation of Pre-Lithiation Reactor>

A pre-lithiation reactor made of stainless steel having width 270 cm×length 20 cm and height 60 cm was prepared. The pre-lithiation solution of the amount corresponding to 30% of the height of the pre-lithiation reactor was injected into the pre-lithiation reactor. The temperature of the pre-lithiation reactor was maintained at 25° C.

The pre-lithiation solution was manufactured by adding $LiPF_6$ of 1.4M concentration as a lithium salt to an organic solvent, which is obtained by mixing ethylene carbonate (EC), fluoroethylene carbonate (FEC) and ethyl methyl carbonate (EMC) at the volume ratio of 10:20:70.

The pre-lithiation reactor was divided into an impregnation section, a pre-lithiation section, and an aging section. A plurality of transfer rolls were installed in the impregnation section, the pre-lithiation section and the aging section for smooth movement of the negative electrode structure.

<Pre-Lithiation>

The negative electrode structure was wound from the negative electrode roll, and was inserted into the pre-lithiation reactor at the speed of 1 cm/min. The unwound negative electrode structure entered the impregnation section and moved for 50 minutes to be impregnated with the electrolyte solution.

The negative electrode structure having passed through the impregnation section entered the pre-lithiation section, and electric current was applied at the current density of 8.84 $mA/cm^2$. At this time, the current was applied in pulse form of the period of 5 seconds.

A lithium metal counter electrode was disposed to be spaced apart from the negative electrode structure by 10 mm in the pre-lithiation section, and stainless steel (SUS) was joined to the lithium metal counter electrode to support the lithium metal counter electrode.

The negative electrode structure having passed through the pre-lithiation section then entered the aging section and was aged while moving in the aging section for 30 minutes.

<Washing and Drying>

A washing tank made of stainless steel having width 50 cm×length 20 cm and height 60 cm was prepared. A roll for transferring a negative electrode structure was installed between the pre-lithiation reactor and the washing tank. Dimethyl carbonate of the amount corresponding to 30% of the height of the washing tank was contained in the washing tank.

The aged negative electrode structure was taken out of the pre-lithiation reactor and was inserted into the washing tank, and moved in the washing tank for 50 minutes.

Thereafter, a drying unit made of stainless steel having width 20 cm×length 20 cm and height 60 cm was prepared. The temperature of the drying unit was 25° C., and inert gas was filled therein. A transfer roll for transferring the negative electrode structure was installed between the washing tank and the drying unit. A collection roll was installed in the drying unit.

The washed negative electrode structure moved in the drying unit through the transfer roll for 20 minutes. The negative electrode structure having moved in the drying unit was wound by the collection roll.

Example 2

When manufacturing a negative electrode structure, the negative electrode active material was made of 90% of graphite and 10% of SiO, and the negative electrode structure was manufactured in the same manner as in the example 1 except that the separation distance between the lithium metal counter electrode and the negative electrode structure was 12 mm in the pre-lithiation section.

Comparative Example 1

In the pre-lithiation section, the distance between the lithium metal counter electrode and the negative electrode structure was maintained as 6 mm. The negative electrode structure was manufactured as in the example 1 except the above point.

Comparative Example 2

When manufacturing a negative electrode structure, the negative electrode active material was made of 90% of graphite and 10% of SiO, and the distance between the lithium metal counter electrode and the negative electrode structure in the pre-lithiation section was maintained as 6 mm. The negative electrode structure was manufactured as in the example 1 except the above point.

Experimental Example 1

<Preparation of Positive Electrode>

A positive electrode slurry was prepared by adding 97.5 wt % of $LiNi_{0.8}Co_{0.1}Mn_{0.1}O_2$ as a positive electrode active material, 1 wt % of Denka black as a conductive material, and 1.5 wt % of PVdF as a binder to NMP (N-Methyl-2-Pyrrolidinone).

The positive electrode slurry prepared above was coated on both surfaces of the aluminum current collector, dried and rolled to thereby prepare a positive electrode.

<Preparation of Battery Cell>

After laminating the above-prepared positive electrode between the negative electrode structure and the polypropylene separator prepared in the above examples and comparative examples, which was then put in a pouch, and an electrolyte solution of 4 ml was injected, which was then sealed, to thereby manufacture a pouch-type full cell.

At this time, the electrolyte solution was manufactured by adding 2 wt % of fluoroethylene carbonate (FEC) to a solvent, which was generated by mixing ethylene carbonate (EC) and ethyl methyl carbonate (EMC) at the volume ratio of 30:70, and then dissolving 1 M $LiPF_6$.

<Cycle Charge/Discharge Experiment>

A charge/discharge reversibility test for the pouch-type full cell manufactured as described above was performed using an electrochemical charge-discharge device. During charging, the battery was charged at a current density of 0.33 C-rate up to a voltage of 4.2 V (vs. Li/Li+), and discharged to a voltage of 2.5 V at the same current density during discharging. At this time, the capacity retention rate at 100-th cycle was calculated by comparing with the discharge capacity at the first cycle according to Formula 1 below, and the result was shown in Table 3. Further, Table 2 shows the summary of experiment conditions of the examples and comparative examples.

Capacity retention rate (%)={(discharge capacity in 100-*th* cycle)/(discharge capacity in the first cycle)}×100 [Formula 1]

Experimental Example 2

In the negative electrode pre-lithiated according to the examples and comparative examples, the components of the SEI film formed on the surface of the negative electrode were measured through NMR. 500 MHz $^1$H NMR of Varian Company was used as the NMR measuring equipment. The results are shown in Table 3 below.

TABLE 2

| Example | Negative electrode composition | Separation distance (d) between lithium metal counter electrode and negative electrode structure in pre-lithiation section |
|---|---|---|
| Example 1 | Graphite 100% | 10 mm |
| Example 2 | SiO 10%, Graphite 90% | 12 mm |
| Comparative Example 1 | Graphite 100% | 6 mm |
| Comparative Example 2 | SiO 10%, Graphite 90% | 6 mm |

TABLE 3

| Example | $Li_2CO_3/ROCO_2Li$ | Capacity retention rate (100 cycles) |
|---|---|---|
| Example 1 | 1.82 | 96% |
| Example 2 | 1.90 | 93% |
| Comparative Example 1 | 1.41 | 90% |
| Comparative Example 2 | 1.19 | 85% |

Referring to Table 3, in the negative electrode according to the example 1 and example 2, the ratio of $Li_2CO_3$ contained in the SEI film on the surface after pre-lithiation was greater than that in the comparative example. As such, it is seen that the capacity retention rate of the battery cell containing the negative electrode according to the examples 1 and 2 is better than that of the comparative examples 1 and 2. This is because a SEI film containing more inorganic components including $Li_2CO_3$ was formed by adjusting the distance between the negative electrode structure and the lithium metal counter electrode to be equal to or greater than 7 mm. As such, it is possible to shown a high capacity retention rate as lithium intercalated in the electrode acts as a lithium reservoir by protecting the negative electrode from external $CO_2$ environment.

On the other hand, in the case of comparative examples 1 and 2, the distance between the negative electrode structure and the lithium metal counter electrode became small. As such, the ratio the inorganic components in the film was relatively small as a result of the pre-lithiation. As such, as the negative electrode reacts with external $CO_2$, etc., lithium intercalated through pre-lithiation was additionally consumed. As such, as lithium, which played a role as a lithium reservoir in the negative electrode, relatively decreased, cycle characteristics were reduced.

Further, when using a silicon-based active material (SiO) as the negative electrode active material, active materials are expanded at the time of charge/discharge, thereby destroying the SEI film, which causes additional lithium consumption. Hence, an electrode containing SiO needs a firmer SEI film. However, in the case of the comparative example 2, the ratio of $Li_2CO_3$ contained in the SEI film was the smallest, and accordingly, the capacity retention rate was also low.

Hence, according to the present invention, the content of the inorganic components in the SEI film can be increased by adjusting the distance between the negative electrode structure and the lithium metal counter electrode, through which the lifespan of the battery can be increased.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

DESCRIPTION OF REFERENCE NUMERALS

1: apparatus for pre-lithiating negative electrode
10: pre-lithiation reactor
**10*a***: impregnation section
**10*b***: pre-lithiation section
**10*c***: aging section
20: negative electrode structure
21: negative electrode current collector
22: negative electrode active material layer
23: non-coated part
24: SEI film
30: pre-lithiation solution
40: negative electrode roll
50: lithium metal counter electrode
60: charge and discharge unit
70: washing tank
71: organic solvent
80: drying unit
90: collection roll

The invention claimed is:

1. An apparatus for pre-lithiating a negative electrode, the apparatus comprising:

a pre-lithiation reactor sequentially divided into an impregnation section, a pre-lithiation section and an aging section, the pre-lithiation reactor accommodating a pre-lithiation solution through which a negative electrode structure is movable;

a negative electrode roll arranged outside the pre-lithiation solution, the negative electrode structure being wound on the negative electrode roll before being moved through the pre-lithiation solution;

a lithium metal counter electrode arranged in the pre-lithiation solution in the pre-lithiation section, the lithium metal counter electrode being spaced apart from the negative electrode structure by a predetermined distance to face the negative electrode structure while the negative electrode structure is moved through the pre-lithiation solution; and a charge and discharge unit connected to the negative electrode structure and the lithium metal counter electrode, wherein a separation distance between the lithium metal counter electrode and the negative electrode structure is in a range of 7 to 15 mm, wherein the lithium metal counter electrode is arranged in a direction parallel to the negative electrode structure, and wherein, in the aging section, the negative electrode structure is left unattended in the pre-lithiation solution, such that the time for which the negative electrode structure is moved in the aging section corresponds to 0.5 to 21 times of the time for which the negative electrode structure is moved in the pre-lithiation section.

2. The apparatus of claim 1, wherein the separation distance between the lithium metal counter electrode and the negative electrode structure is in a range of 9 to 13 mm.

3. The apparatus of claim 1, wherein the lithium metal counter electrode includes a lithium metal laminated on a stainless steel substrate.

4. The apparatus of claim 1, wherein the negative electrode structure includes:

a negative electrode current collector, a negative electrode active material layer on at least one surface of the negative electrode current collector, and a non-coated part on the at least one surface of the negative electrode current collector in a width direction of, and adjacent to, the negative electrode active material layer.

5. An apparatus for pre-lithiating a negative electrode, the apparatus comprising:

a pre-lithiation reactor sequentially divided into an impregnation section, a pre-lithiation section and an aging section, the pre-lithiation reactor accommodating a pre-lithiation solution through which a negative electrode structure is movable;

a negative electrode roll arranged outside the pre-lithiation solution, the negative electrode structure being wound on the negative electrode roll before being moved through the pre-lithiation solution;

a lithium metal counter electrode arranged in the pre-lithiation solution in the pre-lithiation section, the lithium metal counter electrode being spaced apart from the negative electrode structure by a predetermined distance to face the negative electrode structure while the negative electrode structure is moved through the pre-lithiation solution; and a charge and discharge unit connected to the negative electrode structure and the lithium metal counter electrode, wherein a separation distance between the lithium metal counter electrode and the negative electrode structure is in a range of 7 to 15 mm, wherein the negative electrode structure includes:

a negative electrode current collector, a negative electrode active material layer on at least one surface of the negative electrode current collector, and a non-coated part on the at least one surface of the negative electrode current collector in a width direction of, and adjacent to, the negative electrode active material layer, and wherein the lithium metal counter electrode is arranged to overlap only the negative electrode active material layer in a direction perpendicular to a travel direction of the negative electrode as the negative electrode moves in the pre-lithiation section.

6. The apparatus of claim 1, further comprising a washing tank containing an organic solvent.

7. The apparatus of claim 6, further comprising:

a drying unit to dry the negative electrode structure having passed through the washing tank; and a collection roll for winding and unwinding the negative electrode structure transferred to the drying unit.

8. A method for pre-lithiating a negative electrode, the method comprising:

preparing the negative electrode and the apparatus for pre-lithiating the negative electrode according to claim 1;

impregnating the negative electrode structure with the pre-lithiation solution while moving the negative electrode structure in the impregnation section in the pre-lithiation reactor;

pre-lithiating the impregnated negative electrode structure while moving the negative electrode structure in the pre-lithiation solution of the pre-lithiation section to provide a pre-lithiated negative electrode structure; and aging the pre-lithiated negative electrode structure in the aging section, wherein the pre-lithiating is performed by electrochemically charging the negative electrode structure.

9. The method of claim 8, wherein the separation distance between the lithium metal counter electrode and the negative electrode structure is in a range of 9 to 13 mm.

10. The method of claim 8, wherein the lithium metal counter electrode is arranged in a direction parallel to the negative electrode structure.

11. The method of claim 8, wherein the lithium metal counter electrode includes a lithium metal laminated on a stainless steel substrate.

12. The method of claim 8, wherein the negative electrode structure includes:

a negative electrode current collector;

a negative electrode active material layer on at least one surface of the negative electrode current collector; and a non-coated part on the at least one surface of the negative electrode current collector in a width direction of, and adjacent to, the negative electrode active material layer.

13. The method of claim 12, wherein the lithium metal counter electrode is arranged to face only the negative electrode active material layer.

14. The method of claim 8, further comprising washing and drying the negative electrode structure.

15. The method of claim 8, wherein an SEI film is formed on a surface of the negative electrode structure, wherein a content ratio of $Li_2CO_3$ to $ROCO_2Li$ within the SEI film is in a range of 1.5 to 5, and wherein R is at least one selected from the group consisting of an alkyl group having 1 to 4 carbon atoms and an alkylene glycol having 1 to 4 carbon atoms.

16. A negative electrode having a SEI film on a surface of the negative electrode, wherein a content ratio of $Li_2CO_3$ to $ROCO_2Li$ within the SEI film is in a range of 1.5 to 5, and wherein R is at least one selected from the group consisting of an alkyl group having 1 to 4 carbon atoms and an alkylene glycol having 1 to 4 carbon atoms.

17. The apparatus of claim 1, wherein the impregnation section and the pre-lithiation section is separated by a partition.

* * * * *